(12) United States Patent
Iwahara et al.

(10) Patent No.: US 8,567,017 B2
(45) Date of Patent: Oct. 29, 2013

(54) TWO-MEMBER ASSEMBLING STRUCTURE

(75) Inventors: Toshio Iwahara, Okazaki (JP); Takeo Horiuchi, Okazaki (JP); Jyunya Ukai, Okazaki (JP); Jyun Komeno, Okazaki (JP); Kazuki Fujii, Okazaki (JP)

(73) Assignee: Daiwa Kasei Kogyo Kabushiki Kaisha, Aichi-ken (JP)

( * ) Notice: Subject to any disclaimer, the term of this patent is extended or adjusted under 35 U.S.C. 154(b) by 135 days.

(21) Appl. No.: 13/002,474

(22) PCT Filed: Jul. 3, 2009

(86) PCT No.: PCT/JP2009/062205
§ 371 (c)(1),
(2), (4) Date: Mar. 21, 2011

(87) PCT Pub. No.: WO2010/001995
PCT Pub. Date: Jan. 7, 2010

(65) Prior Publication Data
US 2011/0203081 A1    Aug. 25, 2011

(30) Foreign Application Priority Data

Jul. 4, 2008 (JP) ................................. 2008-175661

(51) Int. Cl.
*F16B 5/06* (2006.01)
*F16B 5/12* (2006.01)

(52) U.S. Cl.
USPC ........... 24/297; 24/458; 24/581.11; 296/1.08; 296/72

(58) Field of Classification Search
USPC ................... 24/297, 458, 293, 295, 296, 453, 24/581.11; 296/1.08, 72, 146.7, 214
See application file for complete search history.

(56) References Cited

U.S. PATENT DOCUMENTS 2,784,814 A * 3/1957 Bright ............................. 52/463
4,970,761 A * 11/1990 Nakamura ...................... 24/453
(Continued)

FOREIGN PATENT DOCUMENTS

| JP | 2000-205214 | 7/2000 |
| JP | 2001-050229 | 2/2001 |

(Continued)

*Primary Examiner* — Robert J Sandy
*Assistant Examiner* — Louis Mercado
(74) *Attorney, Agent, or Firm* — Christensen Fonder P.A.

(57) ABSTRACT

A two-member assembling structure in which a clip mounted to a pedestal of an attachment member is inserted into a clip hole of a mating member, the clip includes a pedestal coupling portion coupled to a rib of the pedestal, an engaging arm adapted to pass through the clip hole while undergoing elastic deformation when the clip is inserted into or removed of the clip hole, an engaging surface formed on an outer side surface of the engaging arm and capable of engaging with a hole edge of the clip hole, a stable portion extending from the engaging surface and opposed to the rib of the pedestal so as to be capable of contacting therewith, and a regulating portion protruding toward the rib of the pedestal from a position in the vicinity of the stable portion. As the pedestal of the attachment member, there are prepared at least three kinds of pedestals for low retention, medium retention, and high retention. The rib of the pedestal for low retention is provided with a relief hole allowing entrance of the regulating portion of the clip, and the rib of the pedestal for high retention is provided with a protrusion for receiving the stable portion of the clip.

2 Claims, 8 Drawing Sheets

(56) References Cited

U.S. PATENT DOCUMENTS

| | | | |
|---|---|---|---|
| 5,720,586 A * | 2/1998 | Kawaguchi | 411/508 |
| 5,966,782 A * | 10/1999 | Ishihara et al. | 24/297 |
| 6,119,316 A * | 9/2000 | Ishihara et al. | 24/297 |
| 6,317,937 B1 * | 11/2001 | Ishihara et al. | 24/297 |
| 6,449,814 B1 * | 9/2002 | Dinsmore et al. | 24/297 |
| 6,665,914 B2 * | 12/2003 | Ogawa | 24/297 |
| 6,796,006 B2 * | 9/2004 | Hansen | 24/297 |
| 7,120,971 B2 * | 10/2006 | Osterland et al. | 24/295 |
| 7,231,696 B2 | 6/2007 | Asano et al. | |
| 7,536,755 B2 | 5/2009 | Nakajima et al. | |
| 8,056,193 B2 * | 11/2011 | Park | 24/297 |
| D658,974 S * | 5/2012 | Komeno | D8/356 |
| 2010/0088860 A1 * | 4/2010 | Benedetti et al. | 24/297 |
| 2011/0209309 A1 * | 9/2011 | Camus | 24/458 |

FOREIGN PATENT DOCUMENTS

| | | |
|---|---|---|
| JP | 2001-289217 | 10/2001 |
| JP | 2004-239316 | 8/2004 |
| JP | 2005-188718 | 7/2005 |
| JP | 2008-151304 | 7/2008 |

* cited by examiner

TWO-MEMBER ASSEMBLING STRUCTURE

PRIORITY CLAIM

The present application is a National Phase entry of PCT Application No. PCT/JP2009/062205, filed Jul. 3, 2009, which claims priority from Japanese Patent Application Number 2008-175661, filed Jul. 4, 2008, the disclosures of which are hereby incorporated by reference herein in their entirety.

TECHNICAL FIELD

The present invention relates to two-member assembling structures for assembling an attachment member, such as a center cluster of a vehicle, to a mating member, such as an instrument panel by using a clip.

BACKGROUND ART

Regarding assembling structures of this type, for example, a technique disclosed in Japanese Laid-Open Patent Publication No. 2001-50229 is known. A clip employed in this technique is equipped with a pair of lock members mounted to a pedestal so as to be situated on both sides of a rib of the pedestal, which is molded integrally with an attachment member, and two side walls protruding outwardly from these lock members. And, by inserting the clip mounted to the pedestal of the attachment member into a clip hole provided in the mating member, shoulder portions of the two side walls are engaged with the edge of the clip hole on the inner surface side of the mating member, whereby the attachment member is assembled to the mating member via the clip.

In the technique disclosed in Japanese Laid-Open Patent Publication No. 2001-50229, in the state in which the attachment member has been assembled to the mating member via the clip, the retention load of the clip with respect to the mating member is determined exclusively by the engaging force exerted between the edge of the clip hole and the shoulder portions of both two side walls. And, this retention load is always fixed as long as the clip and the clip hole remain the same. Thus, to change the retention load, it is necessary to employ an appropriate clip selected from among different kinds of clips, and there is a risk of a wrong clip being employed.

Therefore, there is a need in the art for enabling to select different retention loads with respect to the clip hole of the mating member with a single kind of clip, and eliminating an operational error in the step of mounting the clip to the attachment member.

SUMMARY OF THE INVENTION

According to one aspect of the present teachings, in a two-member assembling structure for assembling a predetermined attachment member to a mating member by inserting a clip mounted to a pedestal provided on the attachment member into a clip hole provided in the mating member, the clip includes a pedestal coupling portion to be coupled to a rib of the pedestal protruding from the attachment member, an engaging arm situated on the outer side of the pedestal coupling portion and adapted to pass through the clip hole while undergoing elastic deformation so as to be inwardly pushed and flexed when the clip is inserted into or removed from the clip hole of the mating member, an engaging surface formed on an outer side surface of the engaging arm and capable of engaging with a hole edge of the clip hole on the inner surface side of the mating member, a stable portion extending rearwards from the engaging surface with respect the direction in which the clip is inserted into the clip hole and opposed to the rib of the pedestal so as to be capable of contacting therewith in the state in which the clip has been mounted to the pedestal, and a regulating portion protruding toward the rib of the pedestal from a position in the vicinity of the stable portion.

As the pedestal of the attachment member, at least three kinds of pedestals for low retention, medium retention, and high retention are provided. Each of the three kinds of pedestals has an engagement means for effecting coupling between the rib and the pedestal coupling portion of the clip. And, the rib of the pedestal for low retention is provided with a relief hole allowing entrance of the regulating portion of the clip mounted to the pedestal. The rib of the pedestal for high retention is provided with a protrusion for receiving the stable portion of the clip mounted to the pedestal.

According to this construction, when the engaging arm of the clip passing through the clip hole is inwardly pushed and flexed, the regulating portion enters the relief hole of the rib, and the stable portion is received by the rib in the case that the clip is mounted to the pedestal of the clip for low retention, whereas, in the case that the clip is mounted to the pedestal of the clip for medium retention, the regulating portion is received by the rib. And, in the case that the clip is mounted to the pedestal of the clip for high retention, the stable portion is received by the protrusion of the rib. As a result, assuming the case of mounting the clip to the pedestal for medium retention as a reference, the elasticity characteristic of the engaging arm of the clip is soft when the clip is mounted to the pedestal for low retention, and the elasticity characteristic of the engaging arm of the clip is hard when the clip is mounted to the pedestal for high retention.

As a result, it is possible to employ at least three different levels of retention load for the clip hole of the mating member with a single kind of clip. And, since the selection of this retention load is made based on the kind of pedestal mounted to the clip, it is possible to eliminate an operational error in the step of mounting the clip to the attachment member.

Preferably, an end portion of the stable portion of the clip is situated on the rear side of an end portion of the pedestal coupling portion with respect to the direction in which the clip is inserted into the clip hole, and the regulating portion of the engaging arm connects the end portion of the stable portion and the end portion of the pedestal coupling portion to each other.

In this way, because the end portion of the stable portion of the clip and the end portion of the pedestal coupling portion thereof are connected together by the regulating portion, a beam structure in which the engaging arm has bending fulcrums at both ends thereof is realized. Thus, when the clip is removed from the clip hole of the mating member, the engaging arm undergoes deformation such that the angle between the engaging surface thereof and the inner peripheral surface of the clip hole becomes gentler, thereby facilitating the removal of the clip.

DETAILED DESCRIPTION

Figure 1:
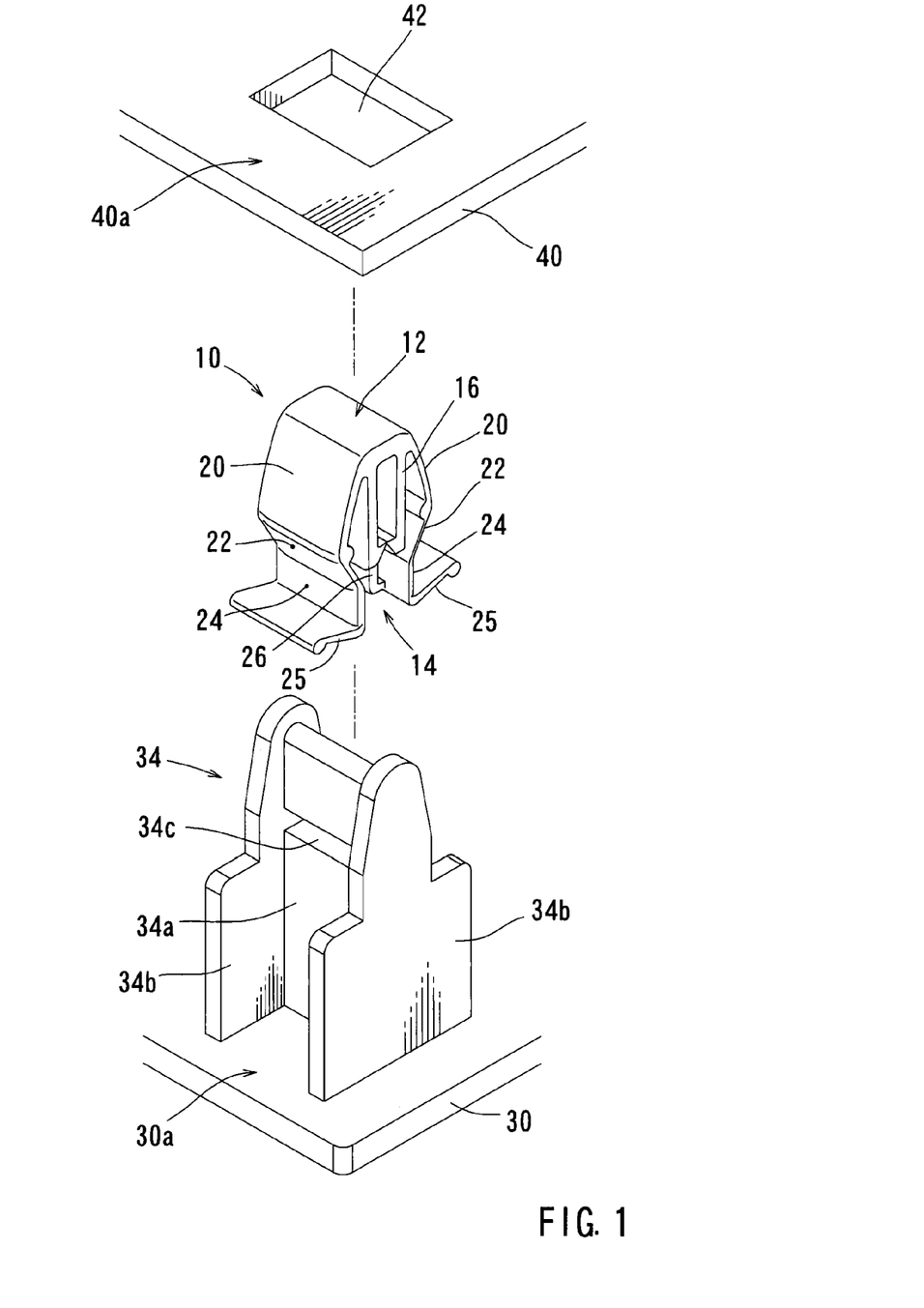
FIG. 1 A perspective view of a two-member assembling structure using a clip

An example will be hereinafter described with reference to the drawings. A clip 10 used to assemble two members to each other is an integrally molded product made of synthetic resin material, and as shown in FIGS. 1 through 4, the clip 10 has a general construction, in which it is closed on the side of a head portion 12 and opened on the side of a skirt portion 14. By way of the clip 10, it is possible to assemble an attachment member 30, such as a center cluster, as shown in FIG. 1 to a mating member 40, such as an instrumental panel. In general, the clip 10 is divided into a pedestal coupling portion 16, and a pair of engaging arms 20 situated on both outer sides of the pedestal coupling portion 16. The head portion 12 of the clip 10 constitutes the forward end portion and the skirt portion 14 constitutes the rear end portion when the clip 10 is inserted into a clip hole 42 (FIG. 1) previously provided in the mating member 40.

The pedestal coupling portion 16 has a pair of holding members 16a protruding from the side of the head portion 12 toward the side of the skirt portion 14, and engagement claws 16b provided on the inner side surfaces opposed to each other at the terminal end portions of the holding members 16a. The holding members 16a are capable of elastic deformation so as to be opened to the right and left using as fulcrums the base end portions thereof on the side of the head portion 12 integrated with the clip 10.

The pair of engaging arms 20 respectively extend on the outer sides of the pedestal coupling portion 16 from the side of the head portion 12 toward the skirt portion 14. On the outer side surfaces of the engaging arms 20 at substantially intermediate portions between the head portion 12 and the skirt portion 14 of the clip 10, there are provided shoulder portions 21 protruding most outwardly. Engaging surfaces 22 set at a predetermined inclination angle are provided on the side of the skirt portion 14 of the clip 10, which is continuous with the shoulder portions 21. When the clip 10 is inserted into a clip hole 42 of the mating member 40, both engaging surfaces 22 can be engaged with the hole edge of the clip hole 42. Further, the clip 10 has stable portions 24 extending from the engaging surfaces 22 of the engaging arms 20 toward the skirt portion 14 of the clip 10. The stable portions 24 are situated on side of the skirt portion 14 relative to the end portions of the holding members 16a of the pedestal coupling portion 16 and on the outer sides relative to the holding members 16a. Unlike the portions of the clip 10 from the head portion 12 to the shoulder portions 21 or the engaging surfaces 22, the stable portions 24 have no inclination angle, and are set to be substantially parallel to the holding members 16a of the pedestal coupling portion 16.

And, the clip 10 has stabilizers 25 bent outwardly from the end portions of the stable portions 24 that are continuous with the engaging arms 20. The stabilizers 25 serves to facilitate the operation of mounting the clip 10 to a pedestal 34 shown, for example, in FIG. 1, and other operations and to contact with the surface of the mating member 40 to thereby prevent rattling of the clip 10 when the clip 10 is inserted into the clip hole 42 of the mating member 40 as will be described later.

Figure 4:
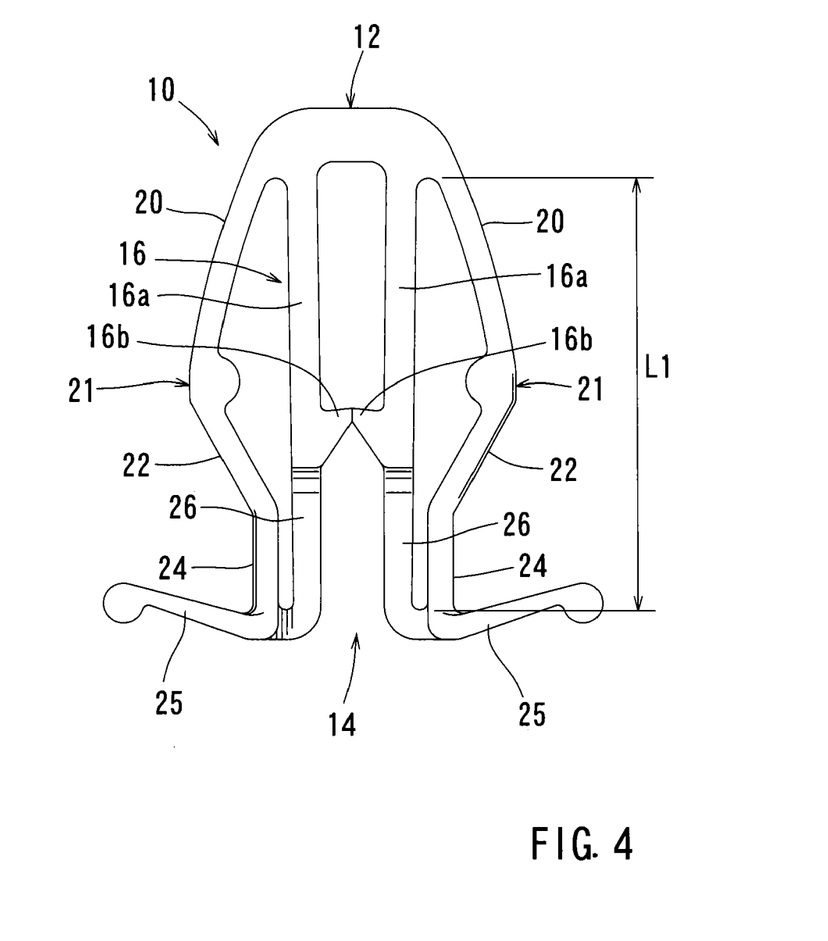
FIG. 4 A front view of the clip

On the inner sides of the stable portions 24 continuous with the engaging arms 20, the clip 10 has regulating portions 26 connecting the end portions of the stable portions 24 and the end portions of the holding members 16a of the pedestal coupling portion 16 to each other. In this way, because the end portions of the stable portions 24 continuous with the engaging arms 20 and the end portions of the holding members 16a of the pedestal coupling portion 16 are connected to each other via the regulating portions 26, each of the engaging arms 20 assumes a beam structure having bending fulcrums at both ends of a length L1 as shown in FIG. 4. That is, the engaging arms 20 are capable of elastic deformation so as to be individually inwardly flexed using as fulcrums the two points on the side of the head portion 12 and the side of the skirt portion 14 of the clip 10.

Both regulating portions 26 are positioned in a state of extending the holding members 16a straight, that is, substantially parallel to the stable portions 24. The dimension of the regulating portions 26 with respect to the width direction of the clip 10 is approximately one third of the holding members 16a (the pedestal coupling portion 16) and the stable portions 24 (the engaging arms 20), and the end portions of the regulating portions 26 are respectively coupled to the centers with respect to the width direction of the holding members 16a and the stable portions 24 (FIG. 3).

Figure 2:
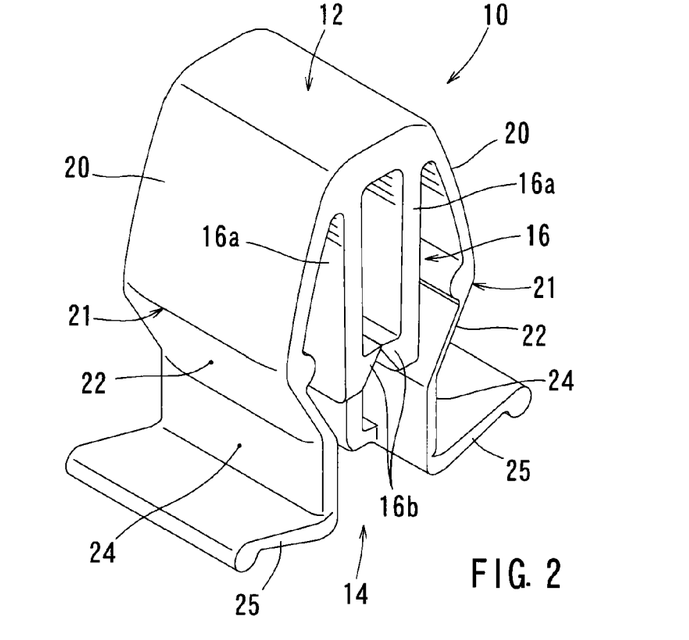
FIG. 2 A perspective view of the clip
Figure 3:
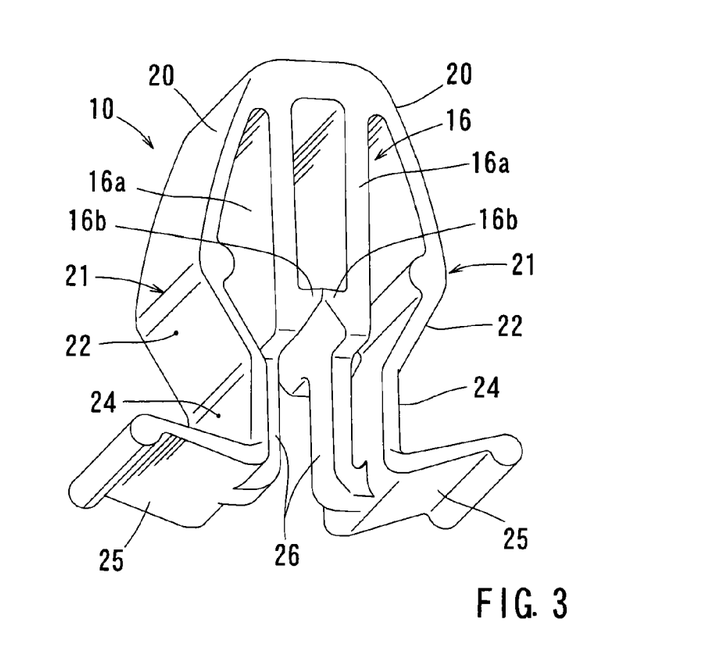
FIG. 3 A perspective view, as seen from below, of the clip

Incidentally, in this embodiment, the dimension of the pedestal coupling portion 16 with respect to the width direction of the clip 10 is set to be the same as that of the engaging arms 20 (FIGS. 1 through 3).

An attachment member 30 shown in FIG. 1 is a molded product made of synthetic resin material, like a center cluster. The mating member 40 likewise shown in FIG. 1 is an instrument panel of a vehicle or the like, and has the rectangular clip hole 42 extending therethrough from the front to the back side at a predetermined position thereof.

Figure 5:
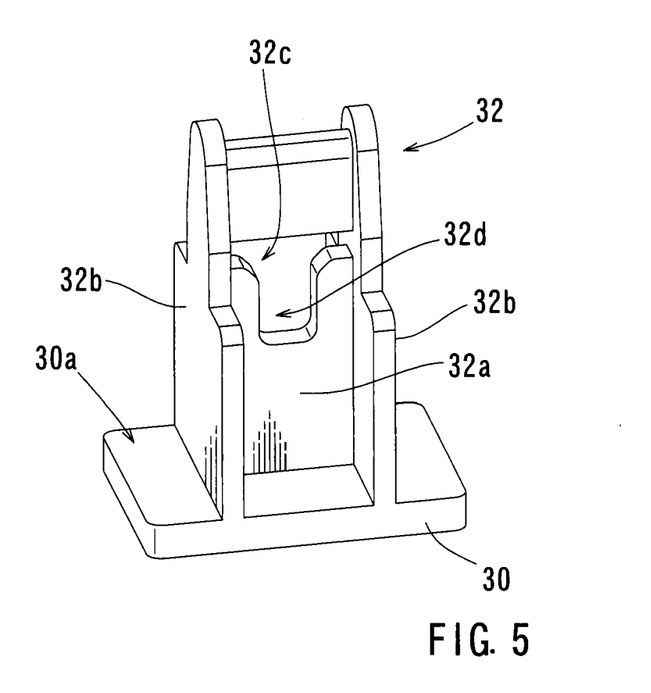
FIG. 5 A perspective view of a pedestal for low retention
Figure 6:
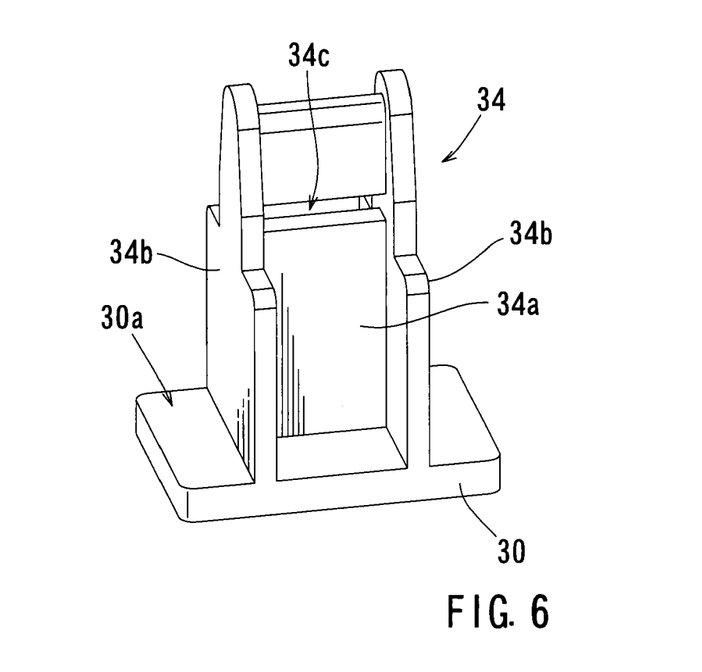
FIG. 6 A perspective view of a pedestal for medium retention
Figure 7:
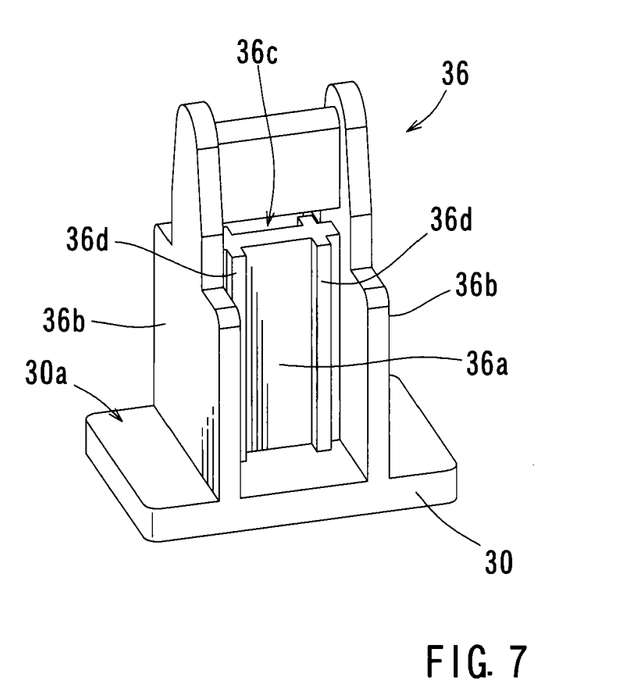
FIG. 7 A perspective view of a pedestal for high retention

On a back surface 30a on the opposite side of the decorated surface of the attachment member 30, there is provided one of three kinds of pedestals 32, 34, and 36 as shown in FIGS. 5 through 7 selected at the designing stage. However, depending upon the way the attachment member 30 is used, two or all of the three kinds of pedestals 32, 34, and 36 may be arranged on the back surface 30a thereof. By mounting the clip 10 to the pedestals 32, 34, and 36, it is possible to select the retention load of the clip 10 with respect to the clip hole 42 of the mating member 40 from among three levels of low retention, medium retention, and high retention.

FIG. 1 shows the pedestal 34 for medium (standard) retention. The basic construction of the different pedestals 32, 34, and 36 will be described with reference to the standard pedestal 34.

As is also apparent from FIG. 6, the pedestal 34 has a rib 34a protruding from the back surface 30a of the attachment member 30, and reinforcing side plates 34b situated on its both sides. In general, the thickness of the rib 34a is set to be slightly larger than the interval between the holding members 16a of the pedestal coupling portion 16 of the clip 10. Thus, when the pedestal coupling portion 16 is coupled to the pedestal 34 as will be described below, the rib 34a of the pedestal 34 enters the interval between the holding members 16a while outwardly pushing and flexing the holding members 16a of the pedestal coupling portion 16. As a result, any rattling of the clip 10 mounted to the pedestal 34 is suppressed. Depending on the kind of the clip 10, the interval between the holding members 16a and the thickness of the rib 34a may be set to be of substantially the same dimension.

The rib 34a has an engagement hole 34c extending therethrough from one to the other side thereof. When the clip 10 is mounted to the pedestal 34 as described above, two engagement claws 16b of the pedestal coupling portion 16 are engaged with the engagement hole 34c from both sides of the rib 34a, so that the pedestal coupling portion 16 and the pedestal 34 are coupled to each other. That is, the engagement hole 34c, which allows coupling between the engagement claws 16b of the pedestal coupling portion 16 and the rib 34a, serves as a "pedestal engagement means". This also applies to engagement holes 32c and 36c of the pedestals 32 and 36 that will be described below.

FIG. 5 shows the pedestal 32 for low retention and a rib 32a, two side plates 32b, and an engagement hole 32c thereof are of the same construction as those of the standard pedestal 34. The specific feature of the pedestal 32 lies in the fact that the rib 32a has a relief hole 32d extending therethrough from one to the other side thereof. The relief hole 32d communicates with the engagement hole 32c and extends downwards, and at the same time, it is set to a width smaller than that of the engagement hole 32c, that is, a width slightly larger than that of the regulating portions 26 of the clip 10. Thus, in the state in which the pedestal coupling portion 16 of the clip 10 is coupled to the rib 32a of the pedestal 32, the regulating portions 26 of the clip 10 can enter the relief hole 32d from both sides of the rib 32a.

FIG. 7 shows the pedestal 36 for high retention, and regarding a rib 36a, two side plates 36b, and an engagement hole 36c thereof, they are of the same construction as those of the standard pedestal 34. The specific feature of the pedestal 36 is that there are respectively provided on both side surfaces of the rib 36a two pairs of right and left protrusions 36d, i.e., four protrusions in total. The protrusions 36d are arranged close to both corners below the engagement hole 36c (both side plates 36b). That is, in the state in which the pedestal coupling portion 16 of the clip 10 is coupled to the rib 36a of the pedestal 36, the protrusions 36d are at positions where they can avoid interference with the regulating portions 26 of the clip 10 and receive the stable portions 24.

Next, the operation of using the clip 10 with three different retention loads of low retention, medium retention, and high retention will be described with reference to FIGS. 8 through 10.

Figure 8:
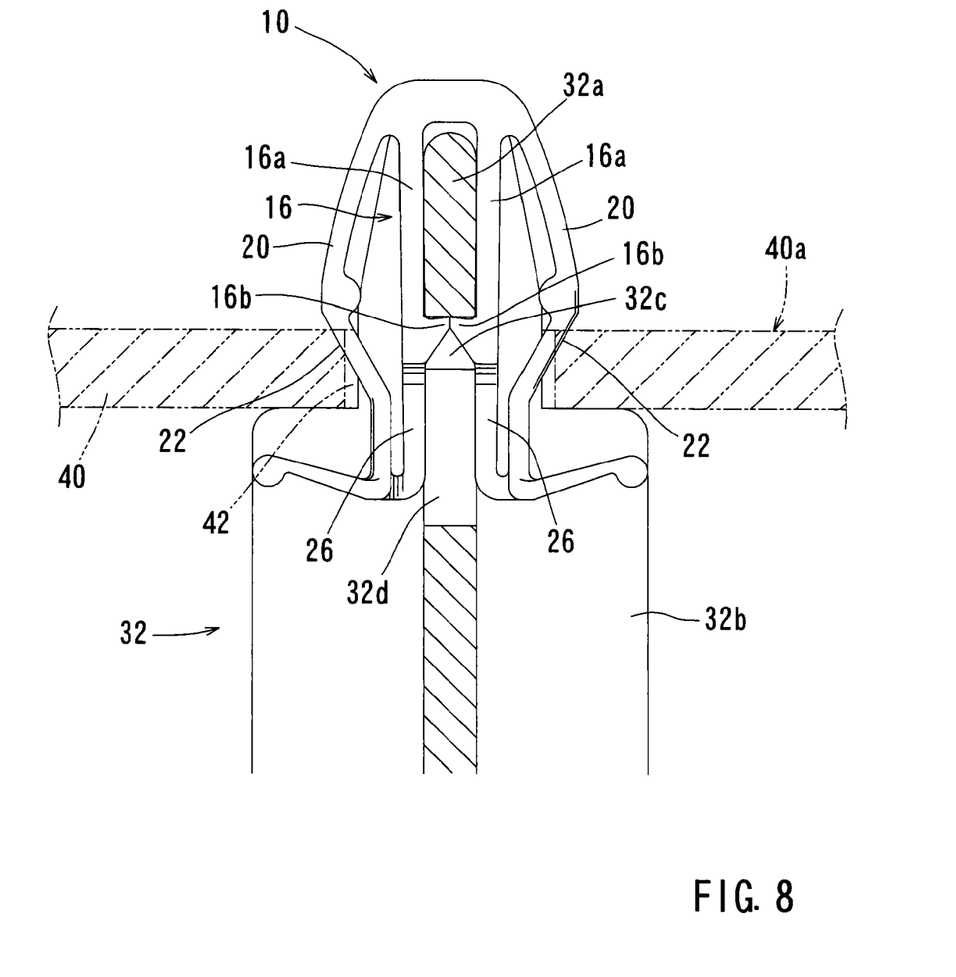
FIG. 8 A front view, partly in section, of the assembling state when the pedestal for low retention is used FIG. 9 A front view, partly in section, of the assembling state when the pedestal for medium retention is used FIG. 10 A front view, partly in section, of the assembling state when the pedestal for high retention is used

First, as shown in FIG. 8, when the clip 10 is to be used with low retention load, the clip 10 is mounted to the pedestal 32 for low retention of the attachment member 30. At this time, the rib 32a of the pedestal 32 relatively enters the interval between the holding members 16a of the pedestal coupling portion 16 from the side of the skirt portion 14 of the clip 10, and the engagement claws 16b of the holding members 16a are engaged from both sides with the engagement hole 32c of the rib 32a. In this state, the holding members 16a of the pedestal coupling portion 16 hold the rib 32a therebetween from both sides thereof, and the clip 10 is mounted to the pedestal 32 in a stable manner. As described previously, the regulating portions 26 of the clip 10 are situated on both sides of the rib 32a and can each enter the relief hole 32d of the rib 32a (FIG. 8).

Next, the clip 10 mounted to the pedestal 32 for low retention is inserted into the clip hole 42 of the mating member 40 starting with the side of the head portion 12. As a result of this operation, the outer side surfaces of both engaging arms 20 of the clip 10 are brought into contact with the inner periphery of the clip hole 42, whereby the engaging arms 20 undergo elastic deformation together with both stable portions 24 so as to be pushed and flexed inwardly. And, when the shoulder portions 21 of both engaging arms 20 are passed through the clip hole 42, and the insertion of the clip 10 is completed, the engaging surfaces 22 of both engaging arms 20 are engaged with the hole edge of the clip hole 42 on the side of the inner surface 40a of the mating member 40 (FIG. 8). As a result, the attachment member 30 is assembled to the mating member 40 via the clip 10.

When both engaging arms 20 of the clip 10 mounted to the pedestal 32 for low retention undergo elastic deformation as described above, both regulating portions 26 of the clip 10 enter, depending upon the deformation amount of the engaging arms 20, the relief hole 32d from both sides of the rib 32a. Thus, in this case, both engaging arms 20 exhibit a relatively soft elasticity characteristic, and undergo deformation with low load. After both stable portions 24 of the clip 10 interfere with both side surfaces of the rib 32a so as to be received by them, both engaging arms 20 exhibit a relatively hard elasticity characteristic. However, at this point in time, the engagement amount of both engaging surfaces 22 with the edge of the clip hole 42 is small.

As a result, the insertion load and the removing load for the clip hole 42 of the mating member 40 of the clip 10 mounted to the pedestal 32 for low retention are both low, and therefore, the clip 10 can be used as a low retention load clip.

Figure 9:
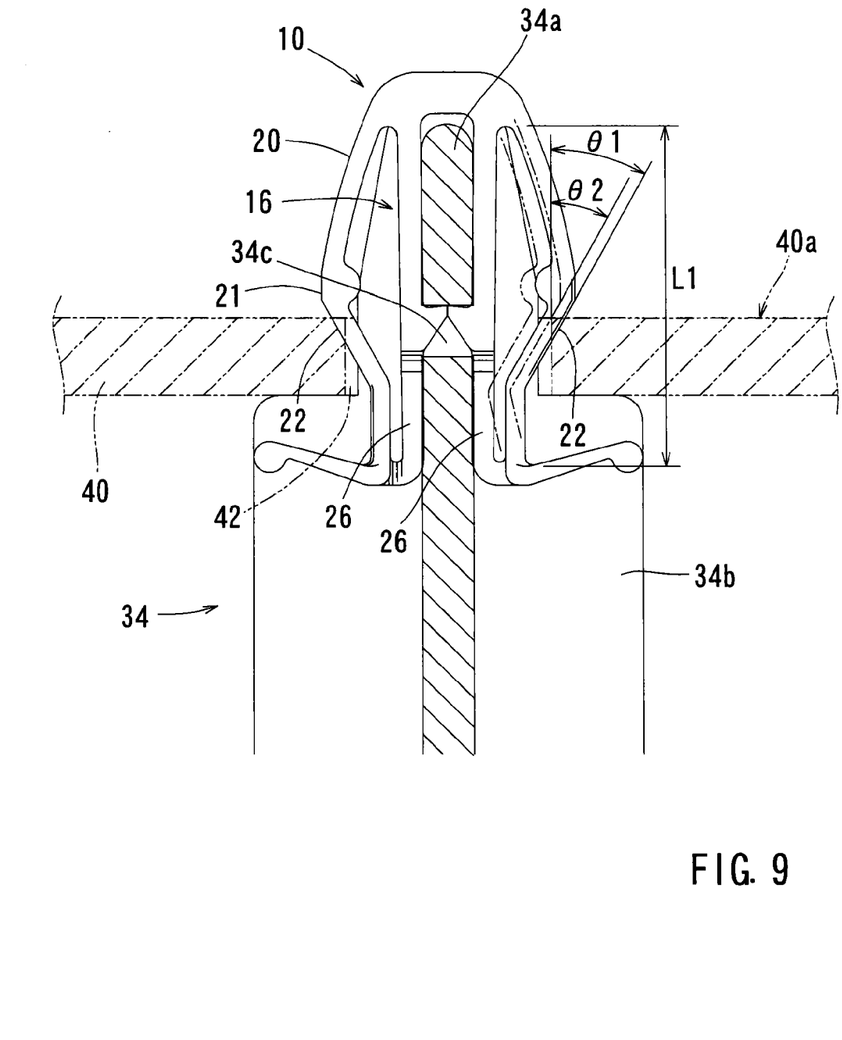

As shown in FIG. 9, when the clip 10 is to be used with medium retention load, the clip 10 is mounted to the pedestal 34 for medium retention of the attachment member 30. In this case, the coupling between the pedestal coupling portion 16 of the clip 10 and the rib 34a of the pedestal 34 is the same as that in the case of the pedestal 32 for low retention. However, in the pedestal 34, there is no relief hole 32d as in the case of the pedestal 32 for low retention, so that, in the state in which the clip 10 is mounted to the pedestal 34, both regulating portions 26 of the clip 10 interfere with both side surfaces of the rib 34a and are received by them. As a result, both engaging arms 20 of the clip 10 assume, as stated above, a beam structure in which they have bending fulcrums at both ends of the dimension L1 as shown in FIG. 4.

Thus, when the clip 10 mounted to the pedestal 34 for medium retention is inserted into the clip hole 42 of the mating member 40, both engaging arms 20 are inwardly pushed and flexed based on the above-described bridging beam structure. Thus, as compared with the case in which the clip 10 is mounted to the pedestal 32 for low retention, both engaging arms 20 of the clip 10 exhibit in this case a relatively hard elasticity characteristic, and the clip 10 can be used as a medium retention load clip.

Figure 10:
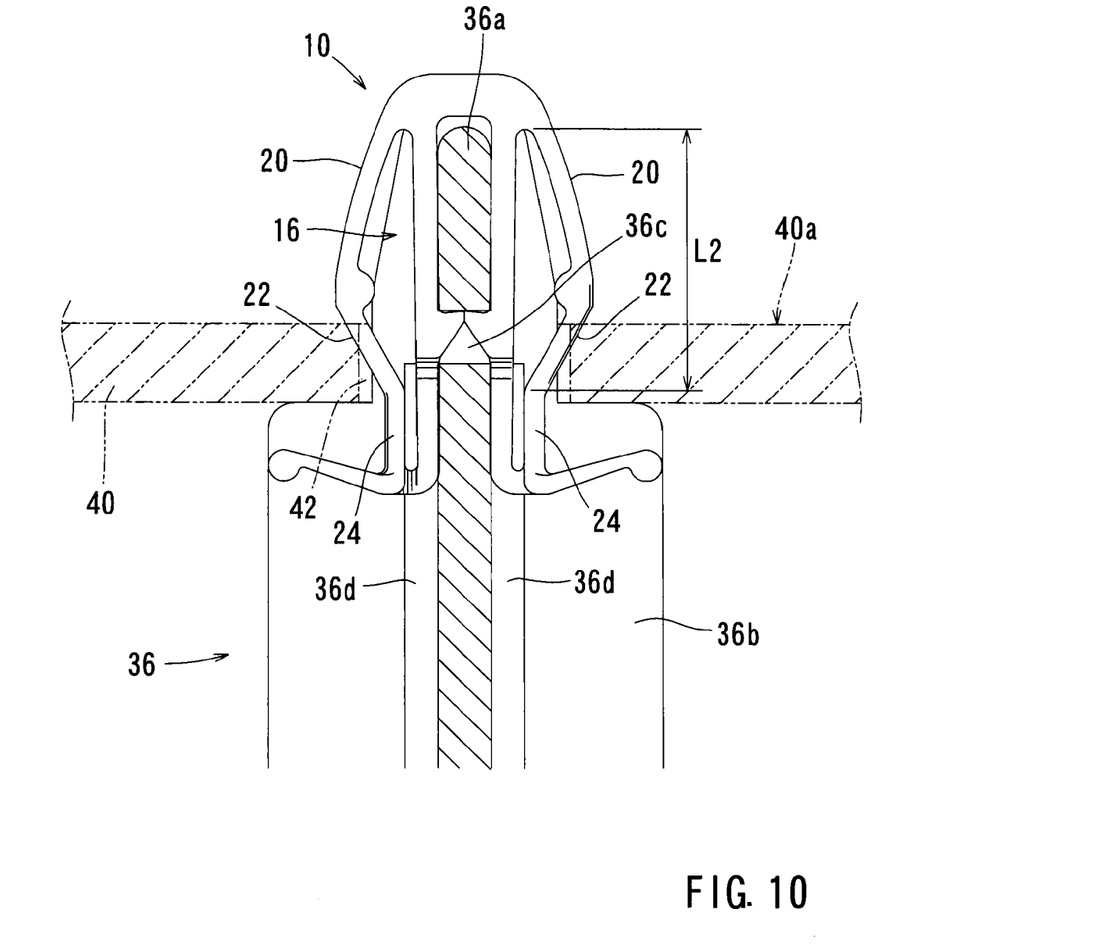

When the clip 10 is to be used with high retention load, the clip 10 is mounted to the pedestal 36 for high retention of the attachment member 30 as shown in FIG. 10. At this time, the coupling between the pedestal coupling portion 16 of the clip 10 and the rib 34a of the pedestal 34 is the same as that in the case of the pedestal 32 for low retention and the pedestal 34 for medium retention. And, in the state in which the clip 10 is mounted to the pedestal 36, both stable portions 24 of the clip 10 interfere with the pairs of protrusions 36d respectively provided on both side surfaces of the rib 36a so as to be received by them. On both side surfaces of the rib 36a, both regulating portions 26 of the clip 10 are situated between both protrusions 36d and do not interfere with the protrusions 36d.

Because both stable portions 24 of the clip 10 are received by the protrusions 36d, both engaging arms 20 assume a beam structure having bending fulcrums at both ends of a length L2 as shown in FIG. 10. The length L2 is smaller than the length L1 shown in FIGS. 4 and 9, so that the length of the bridging beam is necessarily smaller. Thus, the elasticity characteristic of both engaging arms 20 of the clip 10 mounted to the pedestal 36 for high retention is harder than that in the case in which the clip 10 is mounted to the pedestal 34 for medium retention. Thus, in this case, the insertion load and the removing load of the clip 10 for the clip hole 42 of the mating member 40 are both high, so that the clip 10 can be used as a high retention load clip.

In this way, by mounting a single kind of clip 10 to one of the three kinds of pedestals 32, 34, and 36, the retention load of the clip 10 for the clip hole 42 of the mating member 40 can be appropriately selected from among low retention, medium retention, and high retention. While it is common practice to adopt one kind of pedestal for one attachment member 30, if two or more kinds of pedestals are used for one attachment member 30, the differences between the three kinds of the pedestals 32, 34, and 36 are distinct (FIGS. 5 through 7), and their respective arrangement positions are clearly distinguishable. Thus, in the operation of mounting the clip 10 to the attachment member 30, no judgment is required as to which retention load is to be adopted, thus eliminating an operational error.

When, for example, the clip 10 is mounted to the pedestal 34 for medium retention (FIG. 9), both engaging arms 20 assume, as stated above, a beam structure having bending fulcrums at both ends of the dimension L1. Thus, when the clip 10 passes through the clip hole 42, the coupling portions of both engaging arms 20 on the side of the head portion 12 and the side of the skirt portion 14 constituting the bending fulcrums undergo no displacement, and their respective shoulder portions 21 undergo inward displacement.

Thus, when the clip 10 is removed from the clip hole 42 of the mating member 40, an angle between the engaging surfaces 22 of both engaging arms 20 and the inner peripheral surface of the clip hole 42 becomes gentler from θ1 to θ2 as shown in FIG. 9. As a result, even in the case that the mating member 40 is a metal plate and that there are burrs at the edge of the clip hole 42 on the inner surface 40a side, it is not likely that the engaging arms 20 are caught by the burrs, thus preventing damage of the clip 10 and enabling it to be repeatedly attached and detached.

Although the best mode for carrying out the present invention has been described above with reference to the drawings, the embodiment can be changed or modified without departing from the gist of the present invention.

For example, as described above, the clip 10 of this embodiment is provided with the engaging arms 20 on both right and left sides thereof as shown, for example, in FIG. 4. However, when the retention load required of the clip 10 is relatively low or when the space available for use is small, it is possible to adopt a construction in which the engaging arm 20 (inclusive of the stable portion 24) and the regulating portion 26 are provided on one outer side only. Further, it is not always necessary for the regulating portion 26 of the clip 10 to adopt the construction in which the end portion of the holding member 16a of the pedestal coupling portion 16 and the end portion of the stable portion 24 continuous with the engaging arm 20 are coupled together. That is, when there is no need for the engaging arm 20 to adopt a bridging beam structure, it is possible to provide a protrusion on the inner side of the stable portion 24 and to use it as the regulating portion 26, thus providing the above-mentioned function.

Further, as the three kinds of pedestals 32, 34, and 36, it is also possible to prepare ones differing in the thickness of the rib 32a, 34a, 36a or ones differing in the protruding amount of the protrusions 36d of the pedestal 36 in order to select and use them appropriately, so that it is possible to vary the retention load at four or more levels for a single kind of clip 10.

DESCRIPTION OF THE NUMERALS 10 clip
16 pedestal coupling portion
16b engaging claw
20 engaging arm
21 shoulder portion
22 engaging surface
24 stable portion
25 stabilizer
26 regulating portion
30 attachment member
32, 34, 36 pedestal
32a, 34c, 36c engaging hole
36d protrusion
40 mating member
40a inner surface
42 clip hole

The invention claimed is:

1. A combination comprising:
a clip;
a low-retention pedestal;
a medium-retention pedestal;
a high-retention pedestal; and
an attachment member including at least one of the low-retention pedestal, the medium-retention pedestal, and the high-retention pedestal;
wherein the clip is selectively mountable to any one of the low-retention pedestal, the medium-retention pedestal and the high-retention pedestal and can be inserted into a clip hole provided in a mating member, so that the attachment member can be assembled to the mating member;
wherein the clip comprises a pedestal coupling portion to be coupled to a rib of the pedestal protruding from the attachment member, an engaging arm situated on an outer side of the pedestal coupling portion and adapted to pass through the clip hole while undergoing elastic deformation so as to be inwardly pushed and flexed when the clip is inserted into or removed from the clip hole of the mating member, an engaging surface formed on an outer side surface of the engaging arm and capable of engaging with a hole edge of the clip hole on an inner surface side of the mating member, a stable portion extending rearwards from the engaging surface with respect to a direction in which the clip is inserted into the clip hole, and opposed to the rib of the pedestal of the attachment member so as to be capable of contacting therewith in a state in which the clip has been mounted to the pedestal, and a regulating portion protruding toward the rib of the pedestal of the attachment member from a position in a vicinity of the stable portion, and
each of the low-retention, medium-retention and high-retention pedestals having an engagement means for effecting coupling between the rib and the pedestal coupling portion of the clip, the rib of the low-retention pedestal being provided with a relief hole allowing entrance of the regulating portion of the clip mounted to the low-retention pedestal, the rib of the high-retention pedestal being provided with a protrusion for receiving the stable portion of the clip mounted to the high-retention pedestal.

2. The combination of claim 1, wherein an end portion of the stable portion of the clip is situated on a rear side of an end portion of the pedestal coupling portion with respect to the direction in which the clip is inserted into the clip hole, and wherein the regulating portion of the pedestal coupling portion connects the end portion of the stable portion and the end portion of the pedestal coupling portion to each other.

* * * * *